2,721,786
Patented Oct. 25, 1955

2,721,786
PREPARATION OF CYANAMIDE

Leslie G. Boatright, Stamford, and Johnstone S. Mackay, Old Greenwich, Conn., assignors to American Cyanamid Company, New York, N. Y., a corporation of Maine No Drawing. Application April 19, 1952,
Serial No. 283,261

8 Claims. (Cl. 23—190)

This invention concerns the preparation of cyanamide ($H_2NCN$). More particularly it relates to a novel process of reacting ammonia and carbon dioxide in the vapor phase, whereby cyanamide is obtained. Specifically it has been found that when a vapor comprising a suitable mixture of ammonia and carbon dioxide is passed over certain heat-stable, surface-active materials at high temperatures, an apparently catalytic reaction occurs, and on washing the materials cyanamide is obtained in good yields.

The following example, intended as illustrative only, sets forth one preferred embodiment of the invention.

Example

Equal weights of reactant $NH_3$ and $CO_2$ (mol ratio about 2.5:1) are passed into an elongated quartz reactor tube, packed for about one half its length at the center section with finely divided silica gel, while heating the tube at about 650° C., ±5°. A feed rate of about 40 gms. of gas per hour is maintained for about one and half hours. The exit gases, comprising $NH_3$, $CO_2$, and $H_2O$, are collected in acid and alkali traps. The silica gel is cooled and washed with a minimum volume of water, and solid cyanamide may be recovered in good yield by ether extraction of the aqueous solution in the known manner.

It is a curious feature of the invention that substantially all the reaction product remains on the packing rather than passing out with the effluent gases. This phenomenon obtains even when the synthesis is run at red heat. Operation may be carried out at a lower temperature, as low as about 350° C., but a temperature of at least about 500° C. appears more desirable. Above about 800° C., ammonia cracking becomes appreciable. Operation may be at atmospheric, sub-, or superatmospheric pressure. In general, increased pressures are preferred at the higher temperatures in order to avoid space velocities too high for adequate retention time. Reactant proportions may be varied from $NH_3:CO_2$ mol ratios of from about 20:1 to 1:20, or even wider. Suitable high-surface materials or catalysts other than silica gel that may be used include other oxides such as those of aluminum, titanium, zirconium, and the like, as well as various other amorphous materials of high surface area, provided they are stable at the temperatures to be used.

Depending upon the scale of operation it is preferred to modify certain features of the illustrative process. For example, in order to reuse the silica gel or other material economically, it is desirable to leach the cyanamide with methanol or other lower alkanol or the like, dry the methanol-wet silica with hot air, and return it to the reactor. It is also preferred to strip out water from the effluent $NH_3$ and $CO_2$, as by passing the gases over more silica gel or other dehydration means, and thereafter recycling the unconsumed $NH_3$ and $CO_2$ along with the requisite amounts of make-up reactants. Another modification is to use a $NH_3:CO_2$ feed ratio such that nearly all of the $NH_3$ is consumed. For this purpose a $NH_3:CO_2$ mol ratio of about 1:20 is useful. Effluent vapor then comprises $CO_2$ with a minor amount of water, which may be stripped therefrom by passing the vapor through sulfuric acid or the like, followed by recycling the $CO_2$ with the requisite make up $NH_3$.

While the invention has been described with particular reference to a specific embodiment, it is not to be understood to be limited thereby, but rather to be interpreted broadly and construed solely with reference to the appended claims.

We claim:

1. The method of making cyanamide, $NH_2CN$, that comprises heating at a temperature between 350° C.– 800° C. a vapor comprising ammonia and carbon dioxide in the presence of a heat stable material of high surface area, said material comprising essentially an inorganic oxide gel, and thereafter leaching cyanamide from the material.

2. The method according to claim 1 in which the heat-stable material is finely divided silica gel.

3. The method according to claim 1 in which the temperature is about 650° C.

4. A method of producing cyanamide that comprises the steps of: (1) establishing a heated body of a porous, particulate heat-stable material of high surface area comprising essentially an inorganic oxide gel; (2) maintaining the said body at a temperature within the approximate range 350–800° C.; (3) passing through the thus heated body a mixture of ammonia and carbon dioxide gases in a mol ratio in the range of about 1:20 to about 20:1; (4) continuing the reaction until cyanamide is formed on the aforesaid body; (5) cooling the said cyanamide-containing body; and (6) leaching therefrom the cyanamide so formed.

5. The process according to claim 4 in which the body is silica gel.

6. The process according to claim 4 in which the cyanamide is recovered by leaching the cyanamide-containing body with a lower primary alkanol.

7. The process according to claim 4 in which the cyanamide is recovered by leaching the cyanamide-containing body with water.

8. The method of preparing cyanamide continuously that comprises passing a vapor mixture comprising essentially ammonia and carbon dioxide over silica gel in a reaction zone maintained at a temperature of 350°– 800° C., whereby cyanamide is formed on the silica gel, continuously removing a portion of the cyanamide-containing silica from the reaction zone, separating cyanamide from the said silica, returning the silica to the reaction zone in dry condition, removing water from the vapors leaving the reaction zone, and returning the dried vapors to the reaction zone.

References Cited in the file of this patent

UNITED STATES PATENTS

| | | |
|---|---|---|
| 1,622,731 | Muckenfuss | Mar. 29, 1927 |
| 1,672,768 | Miller et al. | June 5, 1928 |
| 1,751,955 | Stoevener | Mar. 25, 1930 |
| 1,806,690 | Kroner et al. | May 26, 1931 |
| 2,326,323 | Benedict | Aug. 10, 1943 |
| 2,413,469 | Schweitzer | Dec. 31, 1946 |

FOREIGN PATENTS

| | | |
|---|---|---|
| 258,048 | Great Britain | Sept. 16, 1926 |
| 364,225 | Great Britain | Jan. 7, 1932 |

OTHER REFERENCES

J. W. Mellor's "A Comprehensive Treatise on Inorganic and Theoretical Chem.," vol. 2, pages 792, 794, and vol. 6, page 609, and vol. 8, page 221, Longmans, Green & Co., New York.

"Cyanogen Compounds," 2nd ed., page 19, Edward Arnold and Co., London.

Pranke's "Cyanamide," 1913 ed., page 11. Chemical Publishing Co., Easton, Pa.

"Handbook of Chem. and Physics," by C. D. Hodgman, 16th ed., pp. 354–355, Chemical Rubber Pub. Co., Cleveland, Ohio.